United States Patent [19]
Keding

[11] Patent Number: 6,110,315
[45] Date of Patent: Aug. 29, 2000

[54] METHOD OF MANUFACTURING BOARDS HAVING A HOMOGENEOUS DECORATIVE SURFACE LAYER COMPRISING AN ELECTRON-BEAM CURED VARNISH

[75] Inventor: Björn Keding, 29 avenue des Papalins, MC 98000, Monaco

[73] Assignee: Bjorn Keding, Monaco, Monaco

[21] Appl. No.: 09/101,923

[22] PCT Filed: Jan. 15, 1997

[86] PCT No.: PCT/SE97/00044

§ 371 Date: Jul. 16, 1998

§ 102(e) Date: Jul. 16, 1998

[87] PCT Pub. No.: WO97/26088

PCT Pub. Date: Jul. 24, 1997

[30] Foreign Application Priority Data

Jan. 18, 1996 [SE] Sweden .................................. 9600169

[51] Int. Cl.$^7$ ...................................... B32B 31/00
[52] U.S. Cl. .................. 156/219; 156/275.5; 156/275.7; 156/307.3
[58] Field of Search .............................. 156/272.2, 273.7, 156/275.5, 275.7, 278, 307.3, 307.7, 219, 220

[56] References Cited

U.S. PATENT DOCUMENTS

| | | | |
|---|---|---|---|
| 3,616,028 | 10/1971 | Miller et al. | 156/275.5 |
| 4,128,696 | 12/1978 | Goebel et al. | 156/228 |
| 4,844,764 | 7/1989 | Nablo et al. | 156/275.5 |
| 5,529,812 | 6/1996 | Keding | 156/275.5 |

*Primary Examiner*—Michael W. Ball
*Assistant Examiner*—Michael A Tolin
*Attorney, Agent, or Firm*—Orum & Roth

[57] ABSTRACT

The present invention relates to a method of manufacturing boards having homogeneous decorative surface layers comprising electron-beam cured varnish, said surface layer comprising at least one foil which is glued to a carrier board. The invention is characterized in that the glue should be of an electron-beam cured type and in that the homogeneity of the surface material is produced by simultaneous electron-beam curing of the glue and of the varnish.

4 Claims, No Drawings

METHOD OF MANUFACTURING BOARDS HAVING A HOMOGENEOUS DECORATIVE SURFACE LAYER COMPRISING AN ELECTRON-BEAM CURED VARNISH

TECHNICAL FIELD

The present invention relates to a method of manufacturing boards having a homogeneous decorative surface layer comprising an electron-beam cured varnish.

BACKGROUND

Electron-beam cured varnishes enjoy considerable advantages over other varnishing systems from an environmental as well as strength point of view. The possibilities of obtaining a completely cured varnish layer and to be able to use larger amounts of varnish per m² produce application conditions that surpass those offered by traditional varnishing systems.

Electron-beam curing equipment is expensive, for which reason it is used only in fields of application wherein considerable advantages stand to be gained from using electron-beam cured varnishes. Since abrasion resistance is a quality that is of greater importance in flooring materials than in any other constructional material and since in addition flooring material is a bulk product, it is a natural field of application for this technology.

In the Swedish Patent Specification 501 526 is described a method of mechanically texturing a smooth and laminated/foiled surface by means of electron-beam cured varnish. This method has proved to provide considerable productivity gains compared with other texturing techniques, particularly in the production of boards to be further treated into flooring boards.

In the production in accordance with this method lamination equipment is available wherein a paper foil is applied against a board by means of a thermoplastic glue. The material is submitted to high temperatures in order to produce rapid curing. When the completely varnished laminated boards leave the production line they have a temperature around 40° C. when stacked. The boards must then be cooled for a duration of at least 48 h before the subsequent treatments may be initiated. Treatment of the material before the lapse of this period increases the risk of the flooring boards warping later on. The reason therefor is uneven temperatures in the material during the treatment. This is a well-known problem known to all manufacturers of thin flooring boards formed with melamine surfaces of various kinds. In the respective production processes associated with this kind of material even larger amounts of heat than those mentioned above are supplied.

Although this problem may be restricted by using new types of glue reacting at lower temperatures, the solution is nonetheless insufficient to satisfactorily solve the problem.

From the exploitation of this prior-art method e.g. the following further experience has been gained, viz.:

Only completely pre-impregnated paper foils may be used to avoid air bubbles in the varnished surface.

The magnitude of the investment makes the productivity factor particularly important.

The speed (and thus the productivity) of the board production line is determined by the lamination technique, the varnish application technique, and the texturing technique used. The sandwich constructions produced today as a surface layer (board, glue, foil, varnish) may exhibit weakness at the edges of the finish flooring boards, unless amounts of varnish of at least 130 g/m2 are used.

The quality of the pre-impregnated decorative foil is of essential importance to the structure as a whole.

In reality, amounts of varnish of 70–80 g/m² are sufficient to obtain adequate strength in flooring boards for use in houses.

OBJECT OF THE INVENTION

The object of the invention is to improve the prior-art method referred to above, with respect to productivity, costs and environmental effects. At the same time, the inventive method simplifies the production process and improves the quality features of the finished surface-material structure. These objects are obtained with the aid of a method defined in claim 1. Further advantageous embodiments of the invention are defined in the dependent claims.

SUMMARY OF THE INVENTION

The present invention relates to a method of manufacturing boards having homogeneous decorative surface layers comprising an electron-beam cured varnish, said surface layer comprising at least one foil which is glued to a carrier board. The invention is characterised in that the glue should be of a kind that is cured when exposed to the radiation of electron beams and in that the homogeneity of the surface material is produced by simultaneous electron curing of the glue and of the varnish.

DESCRIPTION OF PREFERRED EMBODIMENTS

One embodiment will be described in the following for elucidating purposes and to exemplify the method in accordance with the invention.

The production process in accordance with the present invention comprises the following steps:

1. Onto both sides of the dust-free, clean board material 30 g/m² of an electron-curing glue is applied by rolling, the glue preferably being of a kind that exhibits satisfactory adhesive properties also prior to the electron-beam curing process.
2. Application of the decorative and the backing foils by simultaneous rolling and impression.
3. The boards are separated. The paper is cut at the joint between the boards. Owing to the excellent adhesive properties of the glue this step may be performed already prior to the curing.
4. A small amount of electron-beam curing varnish is applied on top of the decorative foil by rolling.
5. The desired amount of electron-beam varnish is applied curtain-fashion.
6. The boards are passed through a curing zone in which first the reverse face and subsequently the upper face are cured by electron-beam guns. Because the reverse face is cured first, the boards adopt a slight convexity that counter-acts the tendency of the upper face to bend in the opposite direction when being cured. No more energy is used to cure the upper face than suffices to allow high-pressure mechanical impression to be performed as the subsequent production step without causing cracking of the surface.
7. Mechanical embossing by means of embossing rollers at high momentaneous pressure.
8. Complete curing of the upper face by means of a finishing electron-beam gun.

This method is advantageous as evidenced by the following results of tests involving gluing with electron-beam cured types of glue:

Adhesion already when the foil is pressed against the glue-covered board surface (i.e. prior to the curing by means of an electron-beam gun) is necessary in order to permit the foil to be cut off without any problem (the foil as also the backing paper being glued straight from the roll).

Electron-beam cured glues have been developed which function satisfactorily considering the requirements specified in the aforegoing.

The glue flows well at a temperature of 30° C. In order to achieve an overall homogeneous structure of the surface material a non-impregnated decorative foil must be used.

In order to avoid air bubbles the foil must be impregnated prior to the curtain coating.

In the curing of the electron-beam cured material of the upper face (glue and varnish) the electron beam guns must have a capacity at least equalling that used in the prior-art method.

The electron-beam cured area must include the quantity of the varnish, the foil, the quantity of the glue and the carrier board down to the depth of penetration thereof by the electron-beam cured glue.

The resulting surface quality becomes wholly homogeneous in the course of crystallisation of the glue and of the varnish in the electron-beam curing process.

The temperature-raising steps of the process are of such a restrictive nature that the material may be subjected to immediate further treatments, should this be desired. No cooling thus is needed.

To coat a surface with large quantities of varnish at high speeds is possible only with use of the curtain-coating technique. Although it is possible to apply approximately 30 g/m$^2$ by roller coating, this quantity is too small even if wet-on-wet coating methods are used and two roller-coating applications are carried out in sequence prior to the curing. Owing to the expensive curing equipment the manufacturer may be reluctant to invest in more electron guns, particularly as the speed for obtaining an acceptable result prevents the installation from being run at a higher speed than 25 m/min. Consequently, curtain coating is required, in principle.

The use of a non-impregnated foil is a necessary prerequisite for obtaining a homogeneous surface quality. In addition, the foil must be impregnated prior to the application of the varnish by curtain coating in order to prevent the varnish from forming bubbles. The foil is impregnated from the bottom face by the electron-beam in connection with the foil being pressed against the board. The upper face thereafter comprises uncovered/exposed foil fibres which then must likewise be impregnated. Such impregnation must be carried out at a capacity of 40 m/min in order not to slow down the rest of the installation.

The method in accordance with the invention involves the application of a larger quantity of glue than is required merely for reasons of adhesion, and it is allowed to impregnate deeply into the foil. Subsequently, a smaller quantity of varnish may be applied to the upper face at high speed by roller coating, whereupon complete impregnation of the foil is achieved.

Actually, more pronounced embossing is desired than may be achieved by means of the prior-art method. To produce texture by application of an additional thin layer of varnish using the roller coating method would, however, lower the total capacity considerably while at the same time the varnish reinforcement imparted by the pressing effects of the embossing (the embossing pressure causes the molecules to form longer chains, which has a positive effect on the abrasion resistance of the varnish surface) would disappear.

The entire board material structure, with the exception of the backing material of the reverse face, has been described above. The decisive reason for developing the homogeneous surface material structure described herein resided in a desire to obviate the need for increasing the temperature of the board material. At the same time a number of other positive qualities in the homogeneous structure compared with sandwich structures are obtained, viz.:

1. The homogeneous structure does not entail the same risks for delamination of the discrete layers of the structure. Milling of tongues and grooves in the flooring boards is easier to perform in the homogeneous surface layer material.
2. The homogeneity, which includes the foil, obviates the risks of discolouring of the finished flooring. The foil does not operate as a separate structural component that could be discoloured, should e.g. spilled liquid penetrate through a cracked joint.
3. In addition to the increased product safety, cost-related as well as environmental advantages are gained by using non-impregnated foil that is impregnated in the production process proper.
4. The homogeneous structure provides a sufficiently strong surface layer without excess dimensioning of the varnish quantity. Consequently, smaller quantities of varnish may be used.
5. The homogeneous surface possesses improved impact and scratch resistance.
6. The productivity of the production line may be raised considerably. Probably an increase of at least 20% is possible.
7. Changes in the production line involves approximately the same investment costs but, as mentioned, the productivity is increased and an improved product is obtained although less material is used and less energy is consumed.

What is claimed is:

1. A method of manufacturing boards having homogeneous, decorative surface layers comprising electron-beam cured varnish, said surface layer comprising at least one non-impregnated foil which is glued to a carrier board, characterized in that the glue is of an electron-beam cured type and in that homogeneity of the surface material is produced by simultaneous electron-beam curing of the glue and varnish, said varnish applied by a first step of rolling a first amount of said varnish onto the foil and applying a second amount of said varnish by a curtain-fashion to said foil, said second amount of varnish is of greater volume than said first amount, wherein said glue and varnish completely impregnate the foil from both sides.

2. A method of manufacturing boards having homogeneous decorative surface layers comprising the steps of:

providing a carrier board having upper and lower faces;

applying an electron-beam curable glue to said upper and lower faces;

applying a decorative foil to said upper face and a backing foil to said lower face;

applying varnish to said decorative foil;

curing the lower face glue with an electron beam; and curing the upper face glue and varnish with an electron-beam, wherein the step of curing the lower face glue is performed prior to the step of curing the upper face glue.

3. A method as claimed in claim 2, comprising the steps of an initial curing of the upper face glue and varnish by electron-beam, mechanical embossing of the upper face is performed, and then a final curing of the upper face by electron-beam.

4. A method as claimed in claim 3, wherein the step of varnishing said decorative foil glued to said upper face of said board further comprises the steps of rolling a first amount of said varnish onto said foil, and applying a second amount of said varnish by curtain-fashion to said foil, said second amount of varnish is of greater volume than said first amount.

* * * * *